US007167688B2

(12) United States Patent
Li et al.

(10) Patent No.: US 7,167,688 B2
(45) Date of Patent: Jan. 23, 2007

(54) RF TRANSCEIVER MODULE FORMED IN MULTI-LAYERED CERAMIC

(75) Inventors: Ko-Mai Li, Taipei (TW); Yo-Shen Lin, Taipei (TW); Chien-Chang Liu, Taipei (TW)

(73) Assignee: Chi Mei Communication Systems, Inc., Tai-Nan (TW)

( * ) Notice: Subject to any disclaimer, the term of this patent is extended or adjusted under 35 U.S.C. 154(b) by 607 days.

(21) Appl. No.: 10/604,568

(22) Filed: Jul. 30, 2003

(65) Prior Publication Data

US 2005/0026647 A1 Feb. 3, 2005

(51) Int. Cl.
*H04B 1/40* (2006.01)

(52) U.S. Cl. ....................... 455/88; 455/78; 455/127.1; 455/275; 455/300; 455/106; 455/281; 455/107; 709/203; 709/230

(58) Field of Classification Search ................. 455/73, 455/571, 103, 127.1, 20, 275, 78, 300, 81, 455/281, 426.1, 561; 375/347
See application file for complete search history.

(56) References Cited

U.S. PATENT DOCUMENTS 5,109,536 A * 4/1992 Kommrusch ................. 455/82
5,513,382 A * 4/1996 Agahi-Kesheh et al. ...... 455/83
5,584,053 A * 12/1996 Kommrusch et al. ......... 455/82
5,896,563 A * 4/1999 Kawanami et al. ........... 455/82
5,903,820 A * 5/1999 Hagstrom .................... 455/82
6,072,993 A * 6/2000 Trikha et al. ................. 455/78
6,289,204 B1 * 9/2001 Estes et al. ................... 455/78
6,434,368 B1 * 8/2002 Stadmark ..................... 455/83
6,670,865 B1 * 12/2003 Lopez ......................... 333/33
6,757,523 B1 * 6/2004 Fry ............................. 455/78
6,941,116 B1 * 9/2005 Jensen et al. ................. 455/76
7,027,789 B1 * 4/2006 Ammar ................... 455/232.1
7,046,959 B1 * 5/2006 Ammar et al. ............. 455/13.1

* cited by examiner

*Primary Examiner*—Marceau Milord
(74) *Attorney, Agent, or Firm*—Jeffrey T. Knapp

(57) ABSTRACT

An RF transceiver module for wireless communication devices includes a multi-layered substrate, an RF transceiver IC mounted on the multi-layered substrate for receiving and transmitting voice or data signals, at least one band selection filter mounted on the multi-layered substrate for filtering received RF signals, an antenna switch integrated in the multi-layered substrate which can be switched to transmit RF signals generated by the power amplifiers to the external antenna or to receive RF signals from an external antenna to the RF transceiver IC through the band selection filter, a plurality of passive devices embedded in the multi-layered substrate, and wiring embedded in the multi-layered substrate for electrically connecting the passive devices, the RF transceiver IC, and the band selection filter.

14 Claims, 7 Drawing Sheets

RF TRANSCEIVER MODULE FORMED IN MULTI-LAYERED CERAMIC

BACKGROUND OF INVENTION

1. Field of the Invention

The present invention relates to an RF transceiver module, and more specifically, to an RF transceiver module formed in a multi-layered ceramic with an RF transceiver IC.

2. Description of the Prior Art

Radio frequency (RF) communication modules are commonly used in wireless communication devices such as cellular phones. Typically, RF communication modules are capable of transmitting and receiving over multiple bands, with dual-band and tri-band RF communication modules being the most popular.

Please refer to FIG. 1. FIG. 1 is a functional block diagram of a prior art RF communication module 10 of a wireless communication device. The RF communication module 10 comprises an antenna switch 12, a set of SAW filters 14, and a receiver 16. When the RF communication module 10 receives RF signals from an external antenna 11, the antenna switch 12 is switched such that the RF signals pass from the antenna 11 to the SAW filters 14 through the antenna switch 12. The received RF signals are then filtered by the SAW filters 14, and sent to the receiver 16. The receiver 16 then amplifies, converts, and demodulates the signals before sending them to the DSP 18 for digital processing. The RF communication module 10 further comprises a transmitter 20 and a set of power amplifiers 22. To transmit voice or data signals, the DSP 18 first sends signals into the transmitter 20. The transmitter 20 then modulates and up-converts the signals, and sends them to the power amplifiers 22 for amplification. The antenna switch 12 is then switched to allow the amplified RF signals to pass from the power amplifiers 22 to the antenna 11 through the antenna switch 12.

Unfortunately, each function in the prior art RF communication module 10 shown in FIG. 1 is realized by separate modules or ICs. These modules or ICs are typically connected together on a printed circuit board (PCB). Having many modules formed on a PCB leads to many problems. First of all, the result is higher assembly cost and takes up a large area on the PCB. Second, the complex wiring between these modules leads to unwanted cross talk and radiated emission problems. Third, each module is made using a different manufacturing process, and electrical characteristics can vary widely as a result. These inconsistent characteristics make tuning and calibrating the RF communication module 10 difficult.

Please refer to FIG. 2. FIG. 2 is a functional block diagram of a prior art RF communication module 30 with an integrated front-end receiver 32 (disclosed in U.S. Pat. No. 6,289,204 B1, "Integration of a Receiver Front-end in a Multilayer Ceramic Integrated Circuit Technology", by Estes et al.). The front-end receiver 32 includes the antenna switch 12, the SAW filters 14, and the receiver 16. The RF communication module 30 has exactly the same functionality as the RF communication module 10 of FIG. 1. The difference is that the front-end receiver 32 is formed on a single multi-layer ceramic substrate. This compact packaging offers advantages in size, weight, and cost. However, the receiver 16 and the transmitter 20 are still formed as separate modules. Separating the receiver and transmitter leads to larger circuit area, higher circuit wiring complexity, and difficulty in tuning and calibrating the RF communication module 30.

SUMMARY OF INVENTION

It is therefore a primary objective of the claimed invention to provide an RF transceiver module with an RF transceiver IC in order to solve the above-mentioned problems.

According to the claimed invention, an RF transceiver module for wireless communication devices includes a multi-layered substrate, an RF transceiver IC mounted on the multi-layered substrate for receiving and transmitting voice or data signals, at least one band selection filter mounted on the multi-layered substrate for filtering received RF signals, an antenna switch composed of PIN diodes or MMIC switches mounted on the multi-layered substrate and passive elements embedded in the multi-layered substrate, which is capable of being switched to receive RF signals generated by the RF transceiver IC or to transmit RF signals received from an external antenna to the RF transceiver IC through the band selection filter, a plurality of passive devices including filters, couplers, and matching circuitries embedded in the multi-layered substrate, and wiring embedded in the multi-layered substrate for electrically connecting the passive devices, the RF transceiver, and the band selection filter.

It is an advantage of the claimed invention that the RF transceiver module contains an RF transceiver IC, which combines functions of a receiver and a transmitter. Therefore, when implementing the RF transceiver module in a wireless communication device, one may have the advantages of smaller circuit area, reduced part count, lower assembly costs, faster assembly time, higher reliability, more consistent circuit performance, and easier to tune and calibrate.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
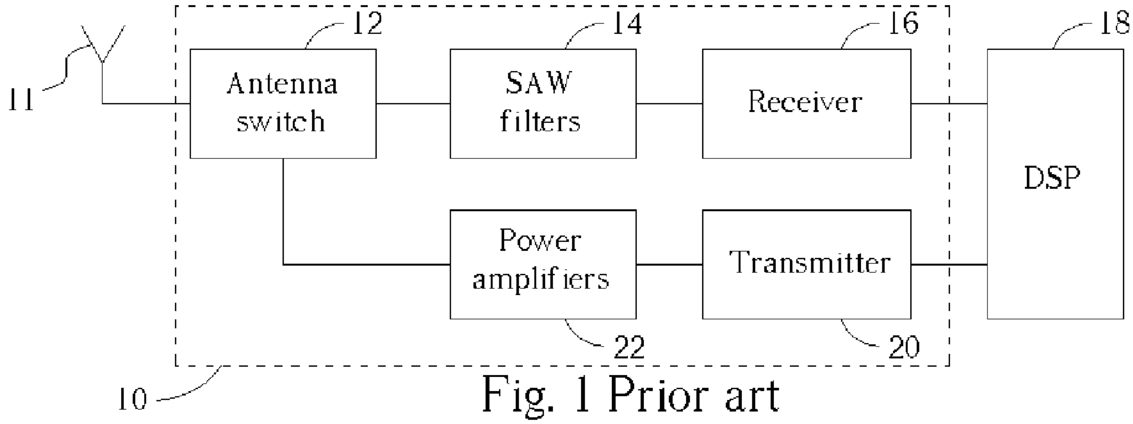
FIG. 1 is a functional block diagram of a prior art RF communication module.
Figure 2:
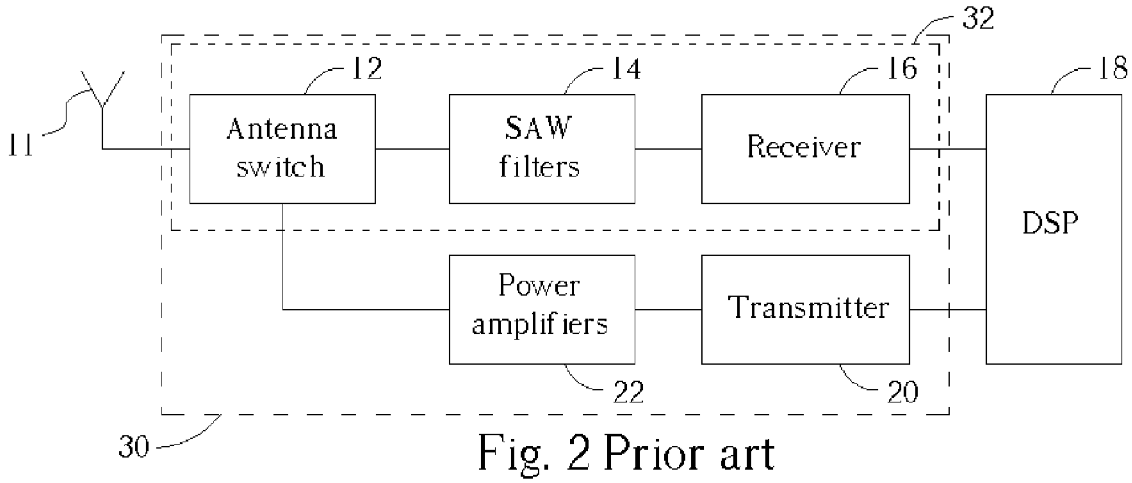
FIG. 2 is a functional block diagram of a prior art RF communication module with an integrated front-end receiver.
Figure 3:
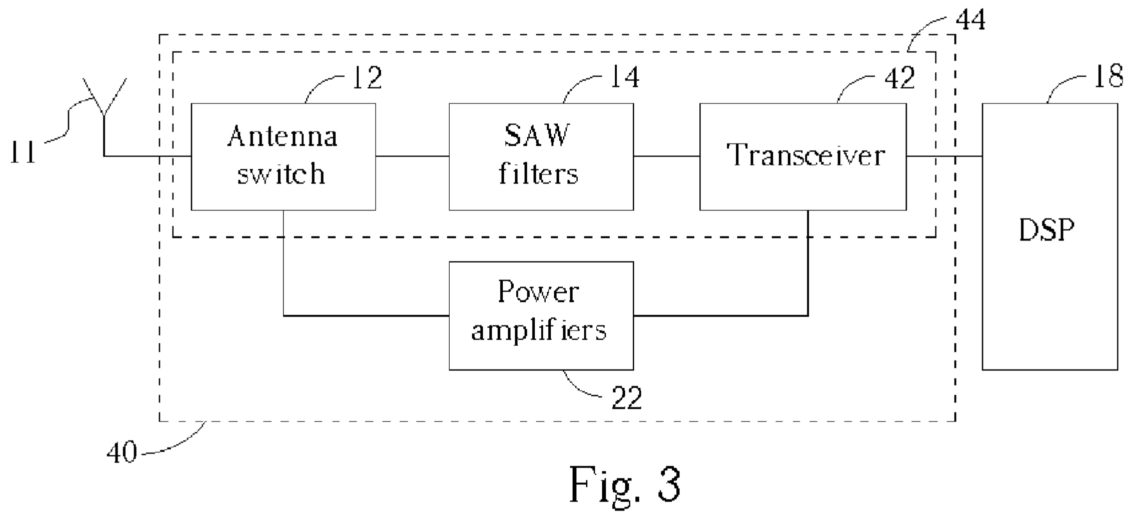
FIG. 3 is a functional block diagram of an RF transceiver module according to the present invention.

Please refer to FIG. 2 and FIG. 3. FIG. 3 is a functional block diagram of an RF communication module 40 according to the present invention. The difference between the present invention RF communication module 40 and the prior art RF communication module 30 shown in FIG. 2 is the integration of an RF transceiver IC 42 in a RF transceiver module 44. The RF transceiver IC 42 combines both the receiver 16 and the transmitter 20 of the prior art RF communication module 30. The RF communication module 40 comprises the RF transceiver module 44, and a set of power amplifiers 22. The RF transceiver module 44 comprises an antenna switch 12, a set of SAW filters 14, and the RF transceiver IC 42.

When the RF communication module 40 receives RF signals from an external antenna 11, the antenna switch 12 is switched such that the received RF signals pass from the antenna 11 to the SAW filters 14 through the antenna switch 12. The received RF signals are then filtered by the SAW filters 14, and sent to the RF transceiver IC 42. The RF transceiver IC 42 then amplifies, converts, and demodulates the signals before sending them to the DSP 18 for digital processing. To transmit voice or data signals, the DSP 18 first sends signals into the RF transceiver IC 42. The RF transceiver IC 42 then modulates and converts signals, and sends them to the power amplifiers 22 for amplification. The antenna switch 12 is then switched to allow the amplified RF signals to pass from the power amplifiers 22 to the antenna 11 through the antenna switch 12.

Figure 4:
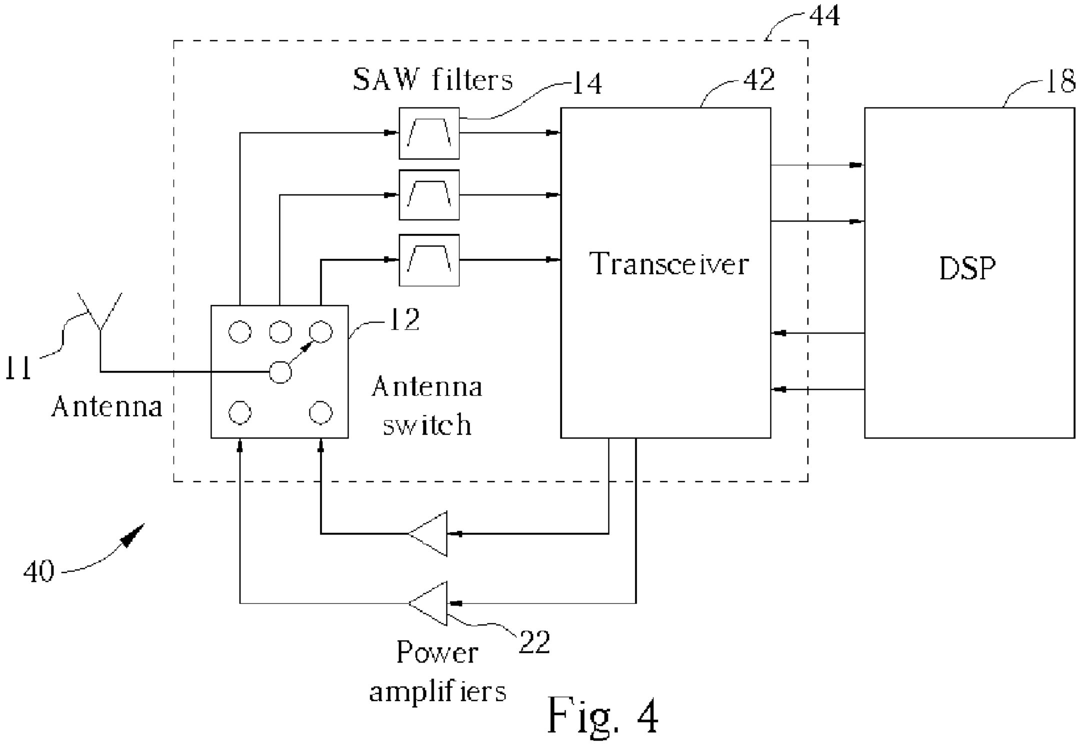
FIG. 4 is a detailed block diagram of the RF transceiver module shown in FIG. 3.

Please refer to FIG. 4. FIG. 4 is a detailed block diagram of the RF communication module 40 shown in FIG. 3. A tri-band RF communication module 40 is illustrated, but any number of bands can be used with the present invention. In the preferred embodiment of the present invention, the RF communication module 40 can work with frequency bands of 900, 1800, and 1900 MHz for GSM and GPRS cellular phone networks. Three SAW filters 14 are shown, with one SAW filter 14 corresponding with each frequency band. In addition, two power amplifiers 22 are shown. Since 1800 MHz and 1900 MHz signals are very close in frequency, a single power amplifier 22 can amplify both of these signals. Another power amplifier 22 is used to amplify 900 MHz signals.

The antenna switch 12 can switch between one of three SAW filters 14 and two power amplifiers 22, depending on the frequency band being used, and whether the RF transceiver module 40 is transmitting or receiving signals. For example, when receiving 1800 MHz RF signals, the antenna switch 12 will switch to the SAW filter 14 corresponding to the 1800 MHz frequency band in order to connect the antenna 11 with the SAW filter 14. On the other hand, when transmitting 900 MHz RF signals, the antenna switch 12 will switch to the power amplifier 22 corresponding to the 900 MHz frequency band in order to connect the antenna 11 with the power amplifier 22.

The present invention RF transceiver module 44 is preferably formed on a multi-layered substrate such as a low temperature co-fired ceramic (LTCC) substrate. A multi-layered substrate allows the entire RF transceiver module 44 to be formed in a single package. With this type of package, all discrete devices are mounted on top of the LTCC substrate and all passive devices are embedded in the multi-layered substrate.

Figure 5A:
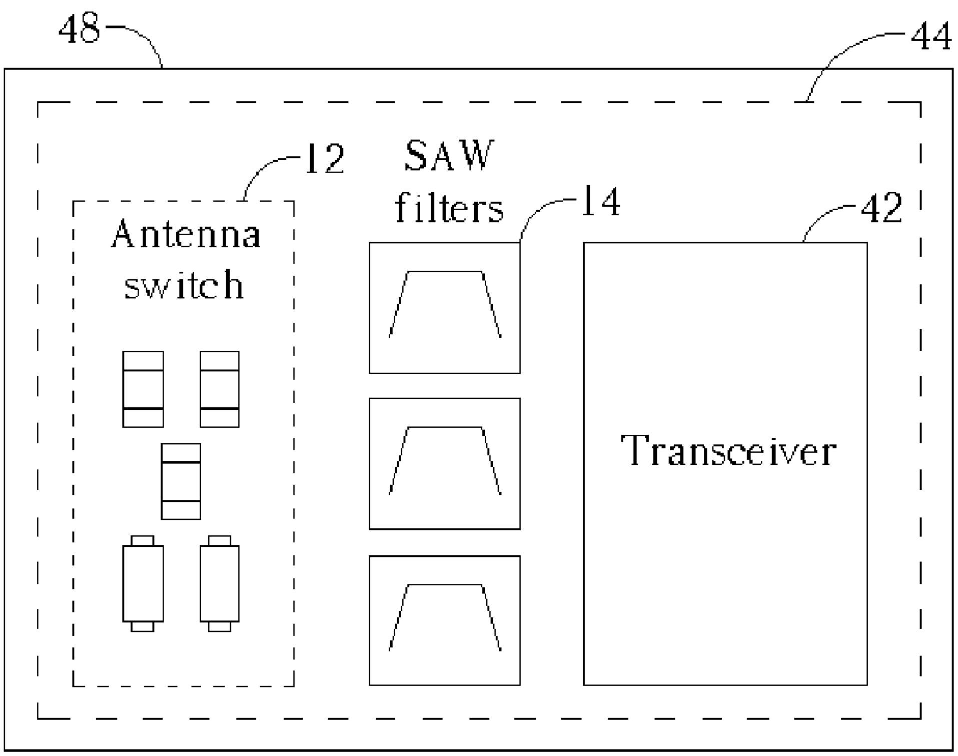
FIG. 5A is a top view of the RF transceiver module formed in an LTCC substrate.
Figure 5B:
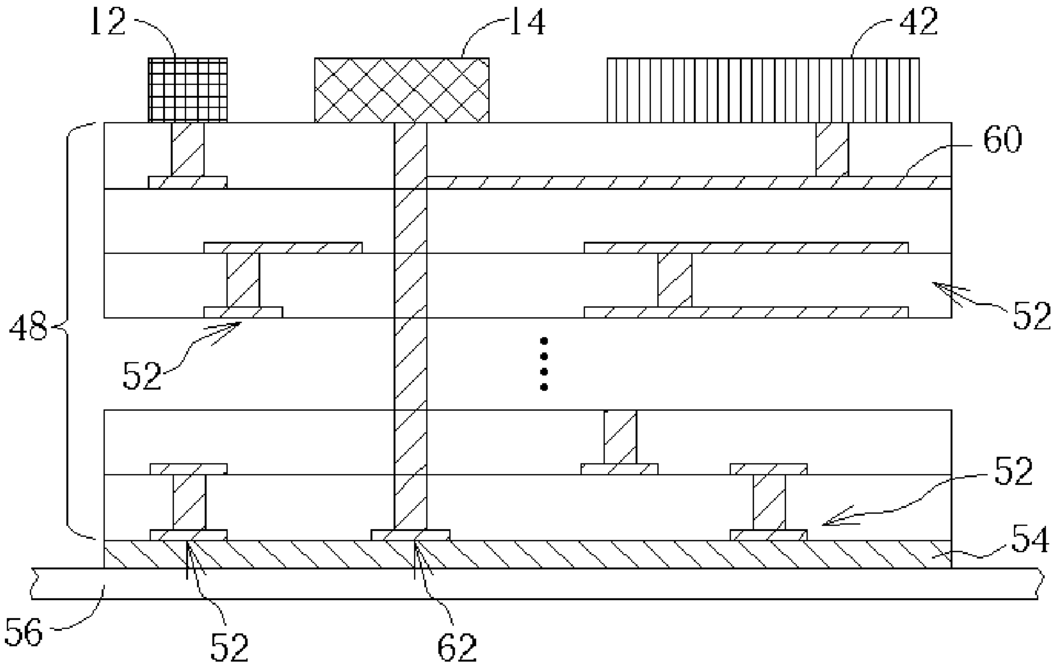
FIG. 5B is a side view of the RF transceiver module formed in the LTCC substrate.
Figure 5C:
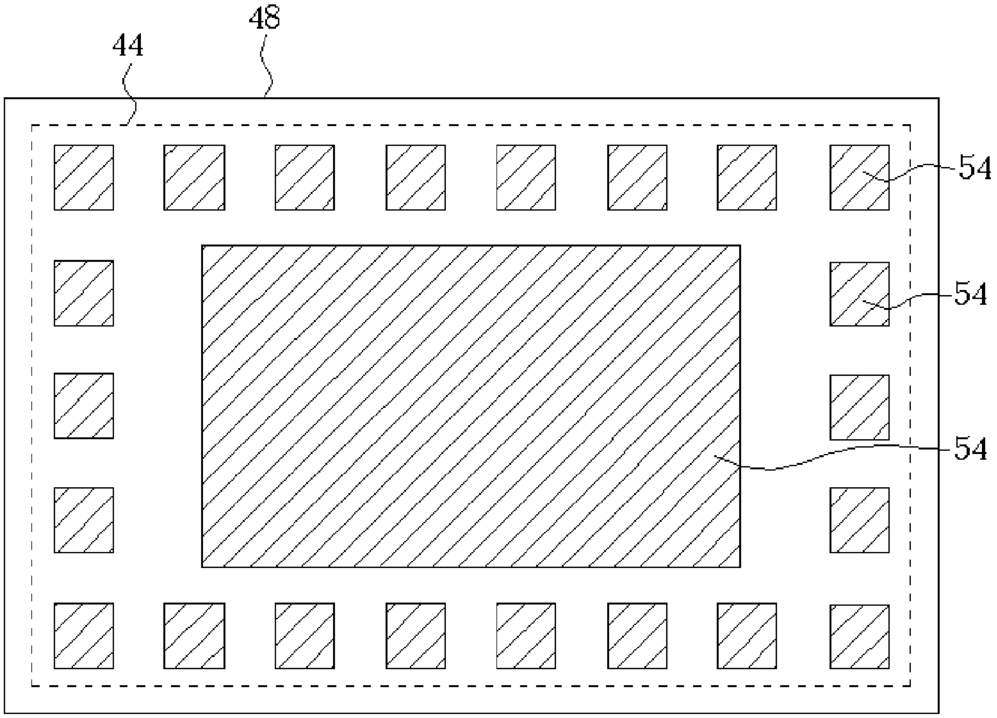
FIG. 5C is a bottom view of the RF transceiver module formed in the LTCC substrate.

Please refer to FIG. 5A and FIG. 5B. FIG. 5A is a top view of the RF transceiver module 44 formed on an LTCC substrate 48. From the top view, only the antenna switch 12, the SAW filters 14, and the RF transceiver IC 42 are visible. FIG. 5B is a side view of the RF transceiver module 44 formed in the LTCC substrate 48, and FIG. 5C is a bottom view. The antenna switch 12, the SAW filters 14, and the RF transceiver IC 42 are all mounted on a top surface of the LTCC substrate 48. The SAW filters 14 and the RF transceiver IC 42 can each be mounted on the top surface in either bare die form or packaged form. Passive components 52 are embedded in layers of the LTCC substrate 48, along with routing circuitry used to form electrical connections. The input, output, and grounding pads 54 are formed on the bottom of the LTCC substrate 48 for electrical connection. The RF transceiver module 44 may then be mounted on a PCB 56 for connecting with other electronic devices.

The LTCC substrate 48, as shown in FIG. 5A and FIG. 5B, has been divided into two sub-regions by the SAW filters 14 and a shielding via fence 62 embedded in the ceramic substrate. The shielding via fence 62 contains shielding vias connected between ground pads of the SAW filters 14 and the grounding layer 54 of the RF transceiver module 44, and are constructed into the shielding fence 62. The high power RF signals from the power amplifiers 22 passing through the antenna switch 12 may then be isolated from the RF transceiver IC 42 by the shielding via fence 62. This leads to lower signal interference and improved circuit performance. In addition, a shielding ground plane 60 is placed one or two ceramic layers beneath the RF transceiver IC 42. This is used to effectively isolate the signals transmitted within the RF transceiver IC 42 and the embedded passive components 52. The shielding ground plane 60 is extended to connect with the via fence 62 under the SAW filters 14 to ensure good ground connection.

Many passive elements are embedded in the ceramic substrate of the RF transceiver module 44. For the antenna switch 12 section, a diplexer for separating the low and high frequency bands, two low-pass filters for filtering of the transmit signals from the power amplifiers, and transmission lines for the received path are embedded. On the other hand, matching circuits for the low noise amplifiers, RF bypass for the bias circuitry, and a coupler for the translation loop of the transmit path are embedded underneath the shielding ground plane 60.

The power amplifiers are built as separated modules in the present invention RF communication module 40 for better heat dissipation as well as less electrical and thermal interference with the RF transceiver module 44.

Compared to the prior art, the present invention RF transceiver module 44 uses the RF transceiver IC 42 instead of separate receiver and transmitter modules. Therefore, the RF communication module 40 contains fewer components and is more compact. In addition, electrical characteristics are more consistent since the receiver and transmitter are combined in one unit, allowing for easier tuning and calibration.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An RF transceiver module for wireless communication devices comprising:

a multi-layered substrate;

an RF transceiver IC mounted on the multi-layered substrate for receiving and transmitting voice or data signals;

at least one band selection filter mounted on the multi-layered substrate for filtering received RF signals;

an antenna switch integrated in the multi-layered substrate which is capable of being switched to transmit RF signals to the external antenna or to receive RF signals from an external antenna to the RF transceiver IC through the band selection filter;

a plurality of passive devices embedded in the multi-layered substrate;

wiring embedded in the multi-layered substrate for electrically connecting the passive devices, the RF transceiver, and the band selection filter, a shielding via fence formed under the band selection filter for isolating high power RF signals produced by a power amplifier from the RF transceiver IC;

a shielding ground plane formed one or two substrate layers beneath the transceiver IC for providing isolation between the embedded passive devices and the RF transceiver IC; and a plurality of input, output, and grounding pads formed on the bottom of multi-layered substrate.

2. The RF transceiver module of claim 1 that is mounted on a printed circuit board (PCB) and the RF transceiver module is electrically connected to the PCB through the input and output pads.

3. The RF transceiver module of claim 2 being electrically connected to a digital signal processor which is mounted on the PCB for converting received analog signals into digital signals, and converting digital signals into analog signals.

4. The RF transceiver module of claim 1 wherein the antenna switch is electrically connected to at least one power amplifier which amplifies RF signals transmitted by the RF transceiver IC.

5. The RF transceiver module of claim 4 wherein the antenna switch is electrically connected to a plurality of power amplifiers, and the antenna switch is capable of being switched to select a power amplifier to transmit RF signals from.

6. The RF transceiver module claim 1 wherein the band selection filter is a surface acoustic wave (SAW) filter.

7. The RF transceiver module of claim 6 wherein the SAW filter is in bare die form.

8. The RF transceiver module of claim 6 wherein the SAW filter is in packaged form.

9. The RF transceiver module of claim 1 wherein the RF transceiver IC is in bare die form.

10. The RF transceiver module of claim 1 wherein the RF transceiver IC is in packaged form.

11. The RF transceiver module of claim 1 wherein the multi-layered substrate is a low temperature co-fired ceramic (LTCC) substrate.

12. The RF transceiver module of claim 1 having a plurality of band selection filters mounted on the multi-layered substrate for filtering received RF signals of corresponding frequency bands wherein the antenna switch is capable of being switched to direct received RF signals to a selected hand selection filter.

13. The RF transceiver module of claim 12 being compliant with a GPRS mobile phone standard.

14. The RF transceiver module of claim 12 being compliant with a GSM mobile phone standard.

* * * * *